United States Patent [19]

Hamilton et al.

[11] Patent Number: 5,078,422

[45] Date of Patent: * Jan. 7, 1992

[54] GAS INFLATOR APPARATUS

[75] Inventors: Brian K. Hamilton, Littleton; Ronald J. Butt, Aurora, both of Colo.

[73] Assignee: Oea, Inc., Aurora, Colo.

[*] Notice: The portion of the term of this patent subsequent to Oct. 29, 2008 has been disclaimed.

[21] Appl. No.: 601,365

[22] Filed: Oct. 22, 1990

Related U.S. Application Data

[63] Continuation-in-part of Ser. No. 516,332, Apr. 30, 1990.

[51] Int. Cl.[5] .............................................. B60R 21/26
[52] U.S. Cl. .................................... 280/736; 280/741; 280/742; 280/737
[58] Field of Search ............... 280/727, 728, 731, 732, 280/734, 735, 736, 737, 741, 742

[56] References Cited

U.S. PATENT DOCUMENTS

| | | | |
|---|---|---|---|
| 3,567,245 | 3/1971 | Ekstrom | 280/737 |
| 3,731,843 | 5/1973 | Anderson, Jr. | 222/3 |
| 3,788,667 | 1/1974 | Vancil | 280/150 |
| 3,895,821 | 7/1975 | Schotthoefer et al. | 280/737 |
| 3,948,540 | 4/1976 | Meacham | 280/150 |
| 3,966,228 | 6/1976 | Neuman | 280/737 |
| 4,018,457 | 4/1977 | Marlow | 280/735 |
| 4,049,935 | 9/1977 | Gruber | 200/83 |
| 4,050,483 | 9/1977 | Bishop | 141/4 |
| 4,380,346 | 4/1983 | Davis et al. | 280/736 |
| 4,899,663 | 2/1990 | Thorn | 102/530 |

FOREIGN PATENT DOCUMENTS

53-11433 2/1978 Japan .

Primary Examiner—Charles A. Marmor
Assistant Examiner—Tamara L. Finlay
Attorney, Agent, or Firm—Sheridan, Ross & McIntosh

[57] ABSTRACT

A gas inflator apparatus for deploying inflatable devices, particularly automobile air bags, which provides an initial flow rate of gas into the air bag, followed by a delayed maximum flow rate to fully deploy the air bag, the apparatus particularly having the capability to program the delay by monitoring certain environmental conditions, namely pressure, and additionally providing temperature compensation for variations in ambient conditions, all of which optimize performance of the gas inflator apparatus over a wider range of operating conditions. A single electrical signal is sent to the gas inflator apparatus upon the sensing of an impact. The signal actuates an electro-explosive device which allows stored gas in the gas inflator apparatus to begin flowing into the air bag. Mechanical elements monitor the differential pressure between a pressure related to the pressure in the housing which stores the gas and a reference pressure. Upon achievement of a programmed differential pressure, the mechanical elements ignite a gas generator propellant, the combustion of which augments the flow rate into the air bag to ensure full inflation thereof.

42 Claims, 3 Drawing Sheets

GAS INFLATOR APPARATUS

This application is a continuationin-part of U.S. Patent Application Ser. No. 07/516,332, having a filing date of Apr. 30, 1990, pending.

FIELD OF THE INVENTION

The present invention relates to gas inflator devices and, more particularly, to such devices that include delays dependent upon at least one factor for controlling the gas flow rate.

BACKGROUND OF THE INVENTION

There have been many attempts in the past to improve the safety accorded to occupants of automobiles when involved in an accident. A portion of these attempts have dealt with the provision of various safety devices in the passenger compartment, most commonly by implementing passenger restraint systems such as safety belts and/or harnesses. However, during the 1970s some automobile manufacturers began supplementing these typical passenger restraint systems with air bags located throughout the passenger compartment to enhance the safety features of the automobile.

Many developments were made regarding the use of air bags during the 1970s, partially as a result of an increased awareness of the need for increased passenger safety as well as in anticipation of possible government regulations requiring that air bags be employed in all automobiles. Although a large amount of development was directed towards automobile air bags during this time period, due to various factors, these activities subsided and have only again begun to increase.

The general concept of an automobile air bag is to provide an inflatable structure that is responsive to an impact which will inhibit the forward motion of a passenger to reduce the likelihood of suffering severe injury when involved in an accident. Although the air bag is quite simple in concept, there have been numerous developments regarding the manner in which the air bag is inflated, including regulation of the flow rate of the materials injected therein.

Many air bag inflators utilize a single, decaying flow rate during inflation once an appropriate signal is received from a collision or other similar detector. U.S. Pat. No. 3,895,821 to Schotthoefer et al., issued July 22, 1975, discloses an inflation apparatus for an air bag safety device which uses only a single charge initiated by an electrical signal. In this apparatus, there is an outer cylinder containing a volume of gas under pressure. At the end of the cylinder nearest the inflatable apparatus, namely the air bag, there is a second inner cylinder with a propellant charge. There is a disk isolating the propellant in the inner cylinder from the outer cylinder. The disk also covers discharge ports connecting the outer cylinder to the manifold which is connected to the air bag. Upon sensing a collision, the propellant charge is ignited which causes the rupturing of the disk. Thereafter, the propellant gases mix with the gas in the outer cylinder and gas begins to flow into the air bag through the ports connecting the outer cylinder to the manifold. Although the Schotthoefer at al. patent discloses using a single electrical signal for deploying an air bag with ignition of a propellant to expand the gas, there is no disclosed delay between an initial flow rate into the air bag and a subsequent increased flow rate into the air bag.

U.S. Pat. No. 4,018,457 to Marlow, issued Apr. 19, 1977, discloses an air bag safety apparatus which offers one inflation rate for low impact collisions and a second for high impact collisions. The Marlow apparatus includes an outer containment which stores a gas under pressure for inflating an air bag. Enclosed within this outer containment is a propellant containment which stores a propellant charge. In a low impact collision, one ignitor activates the propellant charge, causing an increase in pressure within the propellant containment. This increase in pressure eventually ruptures a disk which isolates the propellant containment from both the outer containment and a ramming member. Upon rupture of this disk, exhaust gases from combustion of the propellant charge mix with the gas stored in the outer containment. In addition, the rupture also directs the ramming member towards a disk which ultimately isolates the outer containment from the air bag. The ramming rod breaks this disk and allows the mixed gases to flow into the air bag. The operation of the apparatus for a high impact collision merely adds the additional step of firing a second ignitor which, summarily, causes the propellant charge to burn at a faster rate, thereby providing a higher flow rate into the air bag. Regardless of whether one or two ignitors are activated in the Marlow apparatus to ignite the propellant, the activation is ultimately produced by an electrical signal. Furthermore, even though the Marlow patent discloses two flow rates into an air bag, one for low and a second high impact collisions, there is no disclosed means of increasing the flow rate into an air bag after an initial volume of material has been injected therein.

Although not specifically designed for an air bag system, U.S. Pat. No. 3,731,843 to Anderson, Jr., issued May 8, 1973, discloses an inflating apparatus which allegedly provides a substantially uniform rate of inflation. The apparatus generally includes a housing which is essentially separated into two compartments. The first contains a compressed gas while the second contains an ignition assembly and propellant. A bladder fluidly connected to the second compartment extends into the first compartment, when inflation of an article is desired, a discharge assembly fluidly connected to the first compartment is manually activated and gas from the first compartment begins flowing to the inflatable member. However, a portion of this gas is also directed to the ignition assembly within the second compartment to cause its activation. Activation of the ignition assembly involves the acting of the pressurized gas on a convexly-shaped, domed spring. After a predetermined pressure develops on the convex surface of the domed spring, it pops or snaps into a reversed position to essentially engage a firing pin and percussion primer assembly to ignite the propellant. As the propellant burns, the bladder is inflated, thereby reducing the volume of the first compartment to allegedly provide a more uniform flow of gases from the first compartment into the inflatable member.

A second general category of air bag inflators offer an initial flow rate to partially inflate the air bag which is followed by a second increased flow rate to complete inflation. The manner in which this delayed, increased flow rate is initiated has been the subject of many development efforts in the industry. For instance, U.S. Pat. No. 4,050,483 to Bishop, issued Sept. 27, 1977, discloses an inflation apparatus which incorporates a surge delay. In this apparatus, there is a cylinder containing a volume of gas under pressure. At the discharge end of this cylinder, a rupture disk separates the cylinder from the manifold connecting the cylinder to the air bag. The rupture disk is coupled with a device capable of generating a force sufficient to break the rupture disk. When a collision is sensed, a signal is sent to the device to rupture the disk and thereby allow gas to begin to flow from the cylinder, through the discharge manifold, into the air bag. The rate of deployment of the air bag at this juncture is reduced since the flow of gases prior to the ignition of the propellant charge does not generate sufficient pressure to rupture a disk located in the manifold's main flow channel. Consequently, the initial flow of gases is diverted through secondary flow channels in the manifold. Upon breakage of the rupture disk allowing the initial flow of gas into the air bag, there is a predetermined time delay after which a second electrical signal is sent to the end of the cylinder opposite the discharge manifold to activate a propellant charge contained in an isolated chamber. Upon ignition of this propellant charge, a disk isolating the propellant charge from the cylinder is ruptured and the propellant gases flow into the cylinder, mixing with the gases contained therein. Coinciding with this mixture, gas continues to flow out of the cylinder through the manifold. As the propellant charge burns, pressure within the cylinder will increase sufficiently to break the disk in the manifold's main flow channel. Consequently, the flow rate of the gas into the air bag reaches a maximum level. Although the Bishop patent discloses a variable deployment rate for inflation of an air bag, the variable deployment rate is the result of two electrical signals, one of which is used to rupture the main isolation disk and the second of which is used to ignite the propellant after a predetermined time delay.

U.S. Pat. No. 3,966,228 to Neuman, issued June 29, 1976, discloses an air bag restraint system in which the rate of deployment of the air bag varies over time by using differential pressures to provide a delayed, increased flow rate. In one embodiment of this invention, there is a first cylinder containing a certain volume of gas under pressure. A manifold connects the first cylinder to the air bag, but a disk having charges contained wherein prohibits flow of gases therebetween. At an end opposite of this disk is a second cylinder in communication with the first cylinder by means of an orifice. The second cylinder thus also initially has gas under pressure equal to that within the first cylinder. When sensors detect a collision, an electrical signal is sent to the charges within the disk. The explosion causes the disk to break and gas begins to flow into the air bag, including gas from the second cylinder which flows throuqh the orifice, into the first cylinder, and then into the air bag. Since the cross-sectional area of the orifice is smaller than that of the manifold connecting the first cylinder and the air bag, the pressure in the second cylinder will not decrease as rapidly as the pressure in the first cylinder. When a certain pressure differential between the first and second cylinders is achieved, the piece containing the orifice will break. Upon the breaking of this portion, the flow rate of the gas from the second cylinder into the first cylinder, and eventually into the air bag, will be increased to a maximum level. Although the Neuman patent discloses a variable deployment rate from a single electrical signal, together with the use of a pressure differential, there is no disclosure or suggestion of using the pressure differential for the ignition of any type of propellant. Therefore, in order to fully inflate the air bag, a larger volume of gas is needed since no heat is being applied to expand the gas and thereby increase the pressure and flow rate. Relatedly, it is likely that larger cylinders would be required to store the gas to ensure full inflation of the air bag.

U.S. Pat. No. 3,948,540 to Meacham, issued Apr. 6, 1976, discloses a controlled fluid supply system for an automobile restraint system, one embodiment of which essentially progressively increases the rate of inflation by using principles of differential pressure. In this particular embodiment, there is an outer housing containing pressurized gas and a concentrically positioned inner housing which is essentially divided into three chambers. The first chamber is positioned on the discharge end of the assembly and communicates with the interior of the outer housing through a series of passageways. A shear disk isolates the first chamber from the inflatable member and when ruptured upon detection of a collision, gas flows from the outer housing, through the passageways into first chamber of the inner housing, and into the air bag. A slidable piston-like structure, seated essentially against a portion of the first chamber by a spring within the second chamber, separates the first and second chambers although a restricted passageway through the piston allows limited fluid communication therebetween. Once inflation has been initiated, gas from the second chamber flows into the first chamber and into the air bag. When the forces exerted on the piston by the pressurized gas within the second chamber and biasing spring are exceeded by the force exerted by the pressurized gas in the first chamber on the piston and that force exerted by the pressurized gas in the outer housing on a limited area of an inclined surface of the piston, the piston moves against the force of the spring into the second chamber to expose additional passageways connecting the outer housing and first chamber to increase the flow rate into the air bag. Gas flowing from the outer housing through these passageways exerts additional forces on the piston. As the pressure differential between the outer housing in this region and the second chamber increases, the piston progressively moves further into the second chamber against the force of the spring until it strikes the percussion pin of the percussion ignitor which is positioned within a barrier which separates the second and third chambers. This impact allegedly ignites the propellant contained within the third compartment and the gases generated thereby flow into the outer housing through ports connecting the third chamber and outer housing to further increase the flow rate from the outer housing, into the first chamber, and into the air bag. Although disclosing a variable rate inflation device which utilizes pressure differentials, the flow rate is essentially progressively increased since the flow rate is contingent upon progressive compression of a spring-biased piston. Moreover, the operation of the inflator is quite complex and it would appear that at some point during inflation, the biasing force exerted on the piston by the spring would overcome the forces exerted by pressurized gas in the first chamber and/or outer housing on the piston to close the additional passageways connecting the outer housing and first chamber to inhibit the increased inflation rate.

Japanese Patent Application No. 51-84232, issued July 15, 1976, discloses another air bag actuator which employs pressure differential principles. An outer housing containing a high pressure gas is connected to an air bag but is temporarily isolated therefrom. Positioned within the outer housing is a second housing which is separated into two compartments by a barrier and a piston, the head of which is positioned in the first chamber and biased by a spring against the barrier so that its stem extends through the barrier and into the second chamber. The gas within the second chamber is apparently able to act on the back side of the piston head. Both compartments are fluidly connected with the interior of the outer housing although the passageway for the first chamber is larger than that of the second chamber. As gas flows from the outer housing into the air bag once the isolation is removed, the pressure within the first compartment decreases faster than the pressure within the second chamber due to the difference in cross-sectional areas of the connecting passageways with the outer housing. When a certain pressure differential develops, the piston begins to move against the force of the spring further into the first compartment. After the piston has apparently moved a certain distance, electrodes ignite some type of gas propellant to presumably increase the flow rate into the air bag. Although disclosing a variable rate inflation rate which uses a pressure differential, the gas propellant is ignited by an electrical signal.

Development of air bag inflators of course has not been limited to regulating the flow rate into the inflatable member. For instance, U.S. Pat. No. 4,380,346 to Davis et al., issued Apr. 19, 1983, discloses an inflating apparatus which incorporates certain features to speed up the response of the inflator at low temperatures. The apparatus generally includes an outer housing connected to an air bag and a casing within the outer housing which stores a gas generant composition. A plurality of ports in the inner casing allow for gases generated by burning of the gas generant to flow from the inner casing, into the outer housing, and into the air bag. Initially, some of these ports are covered by single layer of rupturable material while the remaining ports are covered by two layers of the rupturable material to provide the desired temperature compensating feature. When a collision is detected and the gas generant is ignited, the pressure within the inner casing will increase to a level where those ports covered by the single layer will be opened to allow gases to begin flowing into the air bag. Since only some of the ports are initially opened, the pressure buildup within the inner casing is increased over that which would develop if all ports were initially opened, resulting in faster burning of the gas generant. After a second pressure level is reached, the remaining ports are opened to allow more gases to flow into the air bag. Since the gas generant burns slower at lower ambient temperatures, the built-in pressure buildup feature of the inflator increases the burn rate at these lower temperatures so that the inflator allegedly performs more uniformly and at a maximum pressure over a broader temperature range.

U.S. Pat. No. 4,049,935 to Gruber, issued Sept. 20, 1977, discloses a pressure switch which utilizes a diaphragm to act as an indicator of the operability of the air bag system. This particular apparatus does not directly relate to the ignition of a propellant charge or other equivalent which will result in initiation of flow into an air bag. The apparatus is merely directed towards a pressure sensing device wherein by use of a diaphragm, a means is provided to generate a warning signal that the air bag safety device is inoperable in its present condition. In particular, there is a diaphragm which has a constant pressure on one side thereof produced by a volume of gas contained in an isolated reference chamber. The opposite side of the diaphragm is subjected to the pressure of the gas in the cylinder which ultimately flows into the air bag. When the inflating apparatus is operable, the pressure in the cylinder is greater than the pressure in the reference chamber. In such a case, the diaphragm is deflected in a position wherein the apparatus is electrically connected so that if a collision occurs, the inflator will operate to inflate or deploy the air bag by operation of a non-disclosed inflating means. However, if the pressure in the cylinder is reduced below a certain level, the diaphragm will deflect as a result of the pressure in the reference chamber exceeding the pressure in the cylinder by a certain amount. This will result in a separate electrical connection which will generate a warning signal indicating that the inflaring apparatus is inoperable in its present condition.

Although the above-discussed references have each contributed to the useful deployment of air bags, a number of deficiencies still exist, which, if corrected, would provide an improved air bag inflator. An object of the present invention is therefore to provide a plurality of features which are directed toward overcoming these deficiencies, particularly by providing a single, compact apparatus which utilizes a single electrical signal to initiate deployment of an air bag, while still utilizing delayed augmentation of the initial flow rate to fully inflate the air bag. A further object of the present invention is to provide a propellant-augmented inflator which is more simple in construction, has fewer or less expensive component parts, and has all active inflator components on one end of the inflator. Another object of the present invention is to provide an inflator which is more adaptable to programming the gas delivery rate to certain desired criteria and which is temperature compensated to minimize variation in the performance of the inflator due to changes in ambient temperature.

SUMMARY OF THE INVENTION

The present invention provides an apparatus for inflating various devices, but is particularly suitable for use with automobile air bags. The apparatus provides an initial flow rate into the air bag from a source of compressed gas stored in a first housing under a first housing pressure at ambient conditions. This initial flow rate decays over time as the first housing pressure decreases. After lapse of a time delay dependent upon at least one factor, a combustible material stored in a second housing, which is connected to the first housing, is ignited to thereby augment the flow rate into the air bag. This time delay between the initial flow rate and the subsequent augmentation is achieved in part by using a bistable pressure-sensing device which monitors the differential pressure between a pressure related to the first housing pressure and a reference pressure. A temperature sensing device also preferably affects the time delay by reducing the delay as the ambient temperature decreases to in part compensate for the lower burning rate of the combustible material at lower ambient temperatures and increasing the delay as the ambient temperature increases to in part compensate for the higher burning rate of the combustible material at higher ambient temperatures. Consequently, ignition of the combustible material is in reaction to achievement on preselected conditions and is not directly related to a preselected time delay established by a timing device. Furthermore, ignition of the combustible material does not depend upon the receipt of a second electrical signal but is instead activated by mechanical elements.

The present invention will now be described in more detail with regard to a preferred embodiment. An outer housing containing compressed gas under an outer housing pressure is connected to an air bag but is temporarily isolated therefrom by a disk. In close proximity to this disk is a detonation device, such as an electric squib, for rupturing the disk. A gas generator housing which stores a combustible material, such as a gas generator propellant, is contained within the outer housing and is connected thereto by threadable engagement or other suitable techniques. The gas generator propellant may be isolated from the compressed gas in the outer housing by isolating disks or shims. The gas generator housing also contains elements for igniting the combustible material such as a percussion primer(s) and pyrotechnic booster or other suitable ignition devices.

A differential pressure housing is attached to the gas generator housing in the region of the ignition elements by threadable engagement or other suitable techniques. The differential pressure housing includes a bistable, cup-shaped diaphragm which separates the housing into two compartments. The first compartment is fluidly connected to the outer housing and contains compressed gas under a first pressure which is substantially equal to the outer housing pressure in the station state (before initiation of inflation). The side of the diaphragm facing the first compartment has a firing pin or impacting mass attached thereto for engaging with the ignition elements of the gas generator housing. The second compartment is also fluidly connected to the outer housing by an orifice or hole and thus contains compressed gas under a reference pressure which is also substantially equal to the outer housing pressure in the static state. However, the cross-sectional area of the orifice relative to the volume of the second compartment is smaller than the total cross-sectional area of the connections between the first compartment and the outer housing relative to the volume of the first compartment, and consequently, the reference pressure will exceed the first pressure in the dynamic state (during inflation) as described below. Modification of the orifice size, including its elimination, is thus one method to define or control the magnitude of the delay before the ignition elements are activated.

In operation of the preferred embodiment of the present invention, an electrical signal is sent to the electric squib from an impact/collision sensor, actuating the electric squib and rupturing the disk that had isolated the compressed gas in the outer housing from the air bag. Consequently, compressed gas expands from the outer housing and begins to flow into the air bag. This flow of compressed gas into the air bag causes a corresponding drop in the outer housing pressure.

In its pre-impact position, the bistable, cup-shaped diaphragm in the differential pressure housing is deflected in the direction of the second compartment in its first stable position. As the outer housing pressure continues to drop, there is a corresponding drop in the first pressure within the first compartment of the differential pressure housing. The reference pressure within the second compartment of the differential pressure housing also decreases, but at a slower rate than the pressure drop of the first pressure. When a certain pre-established differential pressure develops between the pressures of the first and second compartments (i.e., when the reference pressure exceeds the first pressure by a certain amount), the bistable, cup-shaped diaphragm rapidly inverts into its second stable position, causing the firing pin or impacting mass attached thereto to strike the percussion primer(s) on the gas generator housing. The impact on the percussion primer(s) ignites the pyrotechnic booster which in turn ignites the gas generator propellant. As the gas generator propellant burns, the pressure within the gas generator housing increases to a level at which the gas generator isolation disks are ruptured or removed, thereby allowing the exhaust gases to mix with the compressed gas in the outer housing to augment the flow rate into the air bag.

The point at which the diaphragm inverts from its first stable position to its second stable position is also preferably dependent upon the ambient temperature. In this regard the diaphragm would be made from a bimetallic material such that the pressure differential required to move the diaphragm from its first stable position to its second stable position is lowered with a reduction of the ambient temperature and increased with an increase of the ambient temperature. This is to compensate for the lower turning rate of the propellant at lower ambient temperatures and the higher burning rate at higher temperatures, as well as for the change in function time due to the initial pressure variation with temperature (i.e., lowering of the ambient temperature lowers the storage pressure within the outer housing in the static state, while increasing the ambient temperature increases the storage pressure within the outer housing during the static state).

An alternate embodiment of the present invention is directed to a modification of the gas generator and differential pressure housings. The housings are joined such that there is a first chamber between the housings which is fluidly communicable with the outer housing and is thus under a first pressure substantially equal to the outer housing press re in the static state. A tubular member concentrically aligned with the percussion primer on the gas generator housing extends from the rearward portion of the differential pressure housing, through a rigid member separating the housings, and into the first chamber. Positioned within this tubular member is a preferably temperature sensitive retainer, such as an O-ring, and a projectile. The O-ring is seated against the interior of the tubular member such that it initially prevents the projectile from passing into the first chamber. The seating of the projectile against the O-ring (discussed below) essentially separates the tubular member into a second chamber, which fluidly communicates with the first chamber and is thus under a first pressure, and a third chamber, which fluidly communicates with the differential pressure housing which contains compressed gas under a reference pressure. However, prior to initiation of inflation, it is not necessary for the projectile to seat against the O-ring to limit fluid communication between the second and third chambers, and thus in the static state the outer housing pressure, first pressure and reference pressure may all be substantially equal.

In operation of this alternate embodiment, gas flowing from the outer housing into the air bag as described above causes a decrease in the pressure within the outer housing, and thus the first and second chambers. As a result, the projectile seats against the O-ring to substantially seal the second chamber from the third chamber. When the pressure differential between the second and third chambers of the tubular member reaches a predetermined magnitude (i.e., when the reference pressure exceeds the first pressure by a predetermined magnitude), the O-ring allows the projectile to pass through the tubular member to impact the percussion primer and ignite the propellant, after which operation of the inflator continues as described above. The point at which the O-ring allows the projectile to pass also preferably depends upon the ambient temperature such that less pressure differential will be required to release the projectile as the ambient temperature is reduced, while more pressure differential will be required to release the projectile required as the ambient temperature is increased.

Another alternate embodiment replaces the O-ring and projectile with a retention pin and piston. The retention pin limits movement of the piston within the tubular member toward the percussion primer such that the tubular member is again separated into a second chamber, which fluidly communicates with the first chamber and is thus under a first pressure, and a third chamber, which fluidly communicates with the differential pressure housing which contains gas under a reference pressure.

In operation of this particular alternate embodiment, gas flowing from the outer housing into the air bag as described above causes a decrease in the pressure within the outer housing, and thus the first and second chambers. As a result, the piston is forced against the retention pin. When the pressure differential between the second and third chambers of the tubular member reaches a predetermined magnitude (i.e., when the reference pressure exceeds the first pressure by a predetermined magnitude), the piston shears the retention pin and the piston is propelled by the differential pressure through the tubular member to impact the percussion primer to initiate the augmentation as described above.

The present invention requires only a single electrical signal to deploy an air bag. The electrical signal is directed to an electric squib or other similar electro-explosive device to initiate the inflation of the air bag. After a delay dependent upon at least one factor has elapsed, mechanical elements activate a gas generator to augment the flow into the air bag. Based upon this configuration, the present invention provides a number of advantages not found in any one known inflating device.

The present invention varies the rate of inflation over time, i.e., inflating the air bag at a maximum rate only after the air bag has been partially inflated to a certain degree. This feature is desirable in a number of respects. For instance, delaying the maximum rate of inflation allows the air bag to, in a sense, ease into contact with the occupant which reduces the likelihood that the impact of the air bag on the occupant will in and of itself cause injury. Furthermore, the initial inflation of the air bag with a gas stored under ambient conditions, which is comparatively cooler than that gas received after augmentation by ignition of the gas generator, assists in reducing thermal deterioration of the air bag.

Another advantage of the present invention relates to the ability to regulate the variable inflation rate. For instance, the present invention can be programmed based upon desired criteria over the specified environmental conditions, one of such conditions being pressure. Moreover, the present invention is preferably temperature sensitive to minimize variation in performance of the inflator due to changes in ambient temperature. Consequently, the present invention provides an inflator which does not rely on a limiting delay mechanism such at a timer, but instead upon elements which monitor certain conditions and react accordingly to optimize performance of the inflator over a wider range of operating conditions.

There are also a number of advantages associated with using electrical elements to initiate the inflation of the air bag and mechanical elements to augment the inflation rate after a delay. Initially, reducing the number of required electrical components directly correlates to a reduction in the overall cost of the apparatus. Moreover, the particular mechanical elements used to activate the gas generator also monitor certain conditions, namely a differential pressure and preferably the ambient temperature, to determine when the ignition of the propellant should occur. Consequently, augmentation of the inflation rate is reactive to the changing conditions during the initial inflation of the air bag and is not confined to a definitive time delay, in contrast to systems which initiate augmentation by the sending of a second electrical signal to a gas generator at a predetermined time after initial deployment.

A further advantage of the present invention over current practice relates to what occurs if the apparatus is subjected to a fire. In such a case, the container is heated, thereby increasing the pressure of the stored gas until the disk ruptures. Subsequently, the propellant is ignited and the apparatus functions in a non-catastrophic manner, i.e., it functions as if the squib were activated normally and without container rupture.

The preferred embodiment of the present invention offers a further advantage. Since all major elements of the apparatus are contained within a single element, namely the outer housing, the preferred embodiment is somewhat more compact than many of the known inflating apparatuses and is in fact more simple in construction. This is an important feature when such devices are used with automobile air bags since space in some automobiles is often at a premium.

DETAILED DESCRIPTION

In accordance with the present invention, a gas inflator apparatus 10 is provided for inflating various devices, although it is particularly well suited for use with automobile air bags. The present invention possesses numerous features which enhance the operating characteristics of air bags, including compactness, cost effectiveness, temperature sensitivity, variable programmable flow rates in response to certain changing conditions, and inherently safe bonfire activation. The particular features of the present invention which allow for these and other advantages will be discussed in more detail below.

Figure 1:
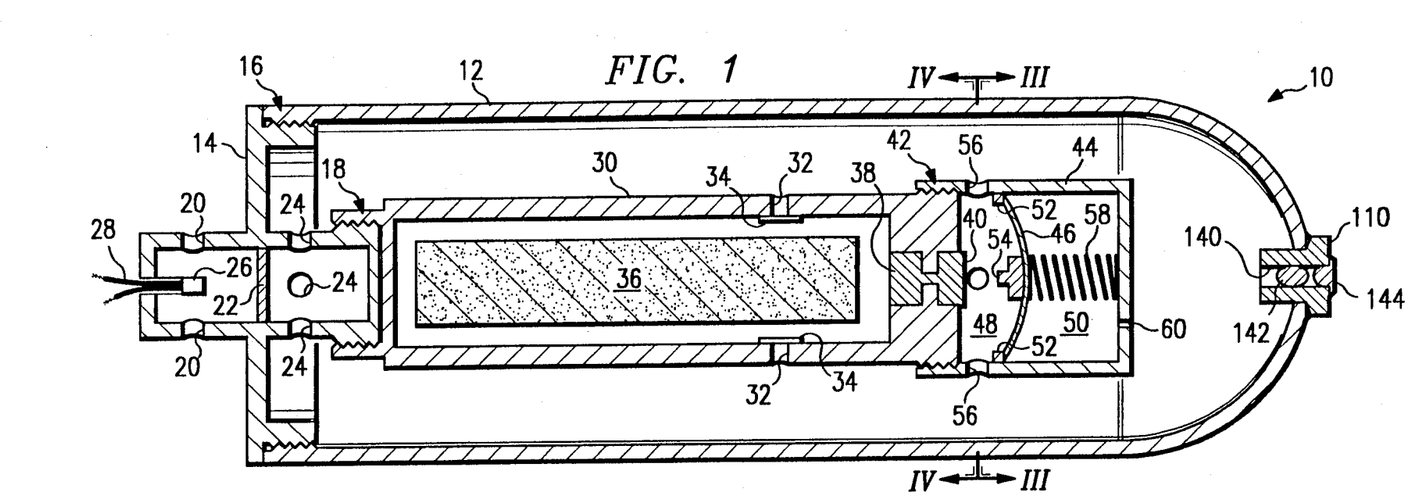
FIG. 1 is a cross-sectional view showing the internal structure of the preferred embodiment of the present invention.

With reference to the drawings, particularly FIG. 1, the present invention generally includes stored gas housing 12 which contains compressed gas under pressure. Stored gas housing 12 is connected to a conduit (not shown) which ultimately connects to an air bag (not shown), but is temporarily isolated therefrom by main isolation disk 22. When involved in a collision warranting deployment of the air bag, main isolation disk 22 is removed or ruptured and the compressed gas within stored gas housing 12 begins to flow into the air bag through the conduit, thereby reducing the pressure within stored gas housing 12.

Gas generator housing 30 is contained within stored gas housing 12 and contains gas generator propellant 36. When the pressure within stored gas housing 12 decays to a predetermined level, gas generator propellant 36 is ignited. The hot exhaust gases from combustion of gas generator propellant 36 ultimately mix with the compressed gas within stored gas housing 12, thereby augmenting the flow rate into the air bag for maximum deployment.

The preferred embodiment of the present invention, illustrated in FIGS. 1-4, will now be described in more detail with regard to the elements and manner of operation. Gas inflator apparatus 10 has three main structural elements, namely stored gas housing 12, gas generator housing 30, and differential pressure housing 44. As most clearly illustrated in FIG. 1, essentially all elements of gas inflator apparatus 10 are contained within stored gas housing 12.

Stored gas housing 2 contains compressed gas which is introduced through as appropriate fill assembly 110 from an appropriate source (not shown). Fill assembly 110 includes an injecting bore 140 through which gas is injected by an appropriate filling device (not shown). After the proper amount of gas has been introduced into stored gas housing 12, the filling device injects a first sealing ball 142 into injecting bore 140, and the compression of first sealing ball 142 substantially seals stored gas housing 12. A second sealing ball 144 may be welded at the inlet area of injecting bore 140.

Stored gas housing 12 is appropriately connected to manifold connector 14 at first connection 16, and manifold connector 14 is appropriately connected to a manifold or other similar conduit (not shown) which is ultimately connected to an air bag (not shown). Although connected to the air bag via manifold connector 14, stored gas housing 12 is temporarily isolated therefrom (i.e., the compressed gas within stored gas housing 12 is substantially prevented from entering the air bag until a proper degree of impact is sensed) by main isolation disk 22 positioned in manifold connector 14. Manifold outlets 20 are positioned on manifold connector 14 in the region between the air bag and main isolation disk 22 and provide the actual means for communication between stored gas housing 12 and the air bag. Housing outlets 24 are positioned on the opposite side of main isolation disk 22 on manifold connector 14 which allows compressed gas in stored gas housing 12 to exert a force on main isolation disk 22 prior to rupture or removal thereof.

In order for gas inflator apparatus 10 to be operative, main isolation disk 22 must of course somehow be removable or rupturable to initiate inflation of the air bag. In that regard, electric squib 26 is positioned adjacent to in close proximity with main isolation disk 22, preferably on the manifold side. When collision or impact sensors (not shown) detect an impact which warrants deployment of the air bag, these sensors send a signal to electric squib 26 through squib leads 28. Upon receipt of the signal, electric squib 26 is activated which ruptures main isolation disk 22 and allows the compressed gas within stored gas housing 12 to begin flowing into the air bag through housing outlets 24, manifold connector 14, manifold outlets 20, and the manifold (not shown).

Gas generator housing 30 is contained within stored gas housing 12 and is appropriately attached at second connection 18 to the portion of manifold connector 14 which extends within stored gas housing 12. Gas generator housing 30 contains gas generator propellant 36, as well as pyrotechnic booster 38 and percussion primer(s) 40 which are used to ignite gas generator propellant 36. Gas generator outlets 32 provide fluid communication between gas generator housing 30 and stored gas housing 12. However, outlet disks 34 temporarily provide isolation therebetween. Outlet disks 34 are either removed or ruptured after ignition of gas generator propellant 36 to allow the exhaust gases from burning of gas generator propellant 36 to mix with the compressed gas in stored gas housing 12 to augment the flow rate into the air bag. If an appropriate gas generator propellant 36 is used, outlet disks 34 may not be necessary.

Differential pressure housing 44 is appropriately connected to gas generator housing 30 at third connection 42. Diaphragm 46 separates differential pressure housing 44 into first compartment 48 and second compartment 50, and substantially prohibits any communication of gases therebetween. Rim 52 is attached to the inner wall of differential pressure housing 44 and provides a seat for diaphragm 46. Diaphragm 46 is a cup-shaped and bistable device, in its first stable position being deflected towards second compartment 50 when gas inflator apparatus 10 is in the static state. Spring 58 is attached to the interior of differential pressure housing 44 in second compartment 50 and to diaphragm 46 to provide a biasing force against diaphragm 46 in the direction of first compartment 48, the direction in which diaphragm 46 will deflect when it moves to its second stable position as will be discussed below. On the side racing first compartment 48, diaphragm 46 has firing pin 54 attached thereto for engagement with percussion primer(s) 40 when gas generator propellant 36 is to be ignited.

Pressure outlets 56 provide the fluid communication between the interior of stored gas housing 12 and the interior of first compartment 48 so that the pressure in stored gas housing 12 and the pressure in first compartment 48 (first pressure) in the static state are substantially equal. Second compartment 50 has orifice 60 which fluidly connects second compartment 50 with the interior of stored gas housing 12 so that the pressure in stored gas housing 12 and the pressure in second compartment 50 (reference pressure) in the static state are also substantially equal. However, the cross-sectional area of orifice 60 is smaller than the total cross-sectional areas of pressure outlets 56. Therefore, as will be discussed in more detail below, in the dynamic state when compressed gas is exiting stored gas housing 12, the rate of the pressure drop in first compartment 48 will exceed that within second compartment 50. As an alternative, orifice 60 may be totally removed so that second compartment 50 is completely isolated and a sufficient pressure differential will still develop, although likely at an increased rate. However, a filling device known in the art would have to be used to introduce compressed gas within second compartment 50.

When compressed gas from stored gas housing 12 begins to flow into the air bag and the pressure within stored gas housing 12 begins to decrease, the first pressure within first compartment 48 correspondingly begins to decrease. In addition, the reference pressure within second compartment 50 also begins to decrease but at a slower rate than the drop of the first pressure in first compartment 48. When the reference pressure within second compartment 50 exceeds the first pressure within first compartment 48 by a predetermined amount, and with the assistance of the biasing force exerted by spring 58, diaphragm 46 will rapidly invert from its first stable position as illustrated in FIG. 1 to its second stable position illustrated in FIG. 2, thereby causing firing pin 54 to strike percussion primer(s) 40 and ignite gas generator propellant 36 via ignition of pyrotechnic booster 38. Ignition and subsequent combustion of gas generator propellant 36 then augments the flow rate into the air bag.

Having described the construction of the preferred embodiment of the present invention and the general sequence of operation, some of the particular elements will now be discussed in more detail.

Stored gas housing 12 contains most of the major components of gas inflator 10 as well as the compressed gas used to inflate the air bag. When the apparatus is used with a right front passenger air bag, the inner volume of stored gas housing 12 can range from about 20 cubic inches to about 70 cubic inches, the preferred volume being about 35 cubic inches. When compressed gas has been introduced into stored gas housing 12 through fill assembly 110, the pressure within stored gas housing 12 will range from about 1000 pounds per square inch (psi) to about 600 psi, the preferred pressure being about 3000 psi, and the practical range being about 2000 psi to about 4000 psi.

Gas generator housing 30 contains gas generator propellant 36 which is used to augment the flow rate into the air bag. Propellants such as plasticized PVC/potassium perchlorate are suitable for such use, and the stored gas is preferably argon. Since the initial ignition of gas generator propellant 36 generates a substantial pressure, gas generator housing 30 must be able to withstand such forces. Consequently, materials such as steel can be used in construction of gas generator housing 30.

Differential pressure housing 44 essentially functions as a part of the pressure sensing means for ignition of gas generator propellant 36 and is contained within stored gas housing 12. As a part of this function, differential pressure housing 44 is separated into two compartments by diaphragm 46. In the static state, first compartment 48 and second compartment 50 are at substantially the same pressure as that in stored gas housing 12. Therefore, differential pressure housing 44 must be able to withstand this pressure.

Diaphragm 46, which separates differential pressure housing 44 into two compartments, plays an integral part in the sensing of the differential pressure to initiate augmentation of the flow rate into the air bag. Diaphragm 46 can be formed from a sheet of austenite stainless steel and have a thickness ranging from about 0.005 inches to about 0.050 inches, depending upon the particular material used in construction. Preferably, however, diaphragm 46 is bimetallic having two metals with different thermal expansion coefficients. Such disks are manufactured by Therm-O-Disc (subsidiary of Emerson Electric Corp.).

When diaphragm 46 is bimetallic, initiation of augmentation can be controlled such that at a lower temperature, a lower differential pressure (and therefore a shorter time) is required prior to movement of diaphragm 46 from its first stable position to its second stable position to initiate augmentation, whereas a higher differential pressure (and therefore a longer time) is required ar high temperatures before augmentation occurs. The variation in degrees of differential pressure based upon essentially ambient temperatures is desirable in part since gas generator propellant 36 burns at different rates at different temperatures. A shorter delay (a lower differential pressure requirement) is necessary at lower ambient temperatures to ensure proper deployment of the air bag due to the slower combustion rate of gas generator propellant 36 at lower ambient temperatures and the lower inherent pressure decay rate due to the lower initial pressure within stored gas housing 12 at lower ambient temperatures. Conversely, a longer delay (higher differential pressure requirement) is desirable at a higher ambient temperature since the combustion rate of gas generator propellant 36 and the initial pressure within stored gas housing 12 at ambient conditions are higher at elevated ambient temperatures.

Since gas inflator apparatus 10 operates basically on differential pressures, the various orifices in the elements also become integral to ensuring proper inflation of the air bag. For instance, at the above-described pressures for stored gas housing 12, housing outlets 24 and manifold outlets 20 must be of sufficient size to allow initial inflation of the air bag without overly rapid flow from stored gas housing 12 into the air bag. In the case where the apparatus is used with the right front passengers air bag, the total area of housing outlets 24 should range from about 0.02 square inches to about 0.5 square inches and the total area of manifold outlets 20 should range from about 0.02 square inches to about 0.7 square inches.

Since initiation of augmentation relates to development of a pressure differential between second compartment 50 and first compartment 48, the size of pressure outlets 56 and orifice 60 are important. In the case where the apparatus is used with the right front passenger air bag, pressure outlets 56 should have an area ranging from about 0.02 square inches to about 0.25 square inches. Orifice 60, which also controls the time dependency of the differential pressure that activates diaphragm 46, should have a cross-sectional area of up to about 0.001 square inches.

The rate at which exhaust gases from combustion of gas generator propellant 16 leave gas generator housing 30 is also important since it is directly related to the degree of augmentation or the flow rate into the air bag. Consequently, the total area of gas generator outlets 32 should range from about 0.005 square inches to about 0.15 square inches.

The remaining elements of the preferred embodiment of the present invention are "off-the-shelf" type items. For instance, electric squib 26 can be any type of device which generates a sufficient force to rupture main isolation disk 22. Likewise, pyrotechnic booster 38, percussion primer(s) 40, and firing pin 54 are also commonly available items that can be obtained from a number of known sources. Finally, spring 58 should have a spring constant that will enable it to be compressed to a degree necessary to exert a force on diaphragm 46.

Figure 2:
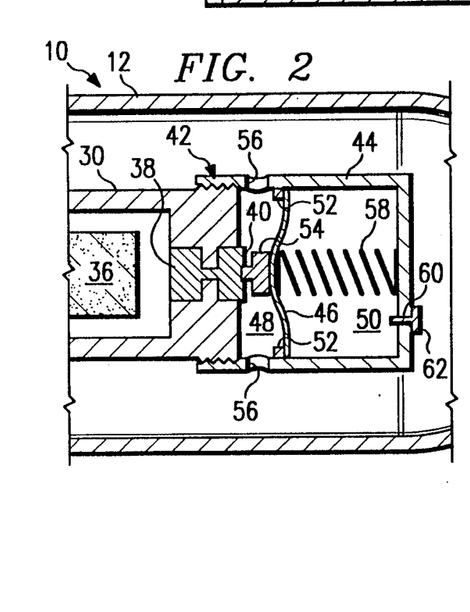
FIG. 2 is an enlarged, cross-sectional view of the pressure-sensing and ignition means of the preferred embodiment of FIG. 1 after ignition has occurred.
Figures 3, 4:
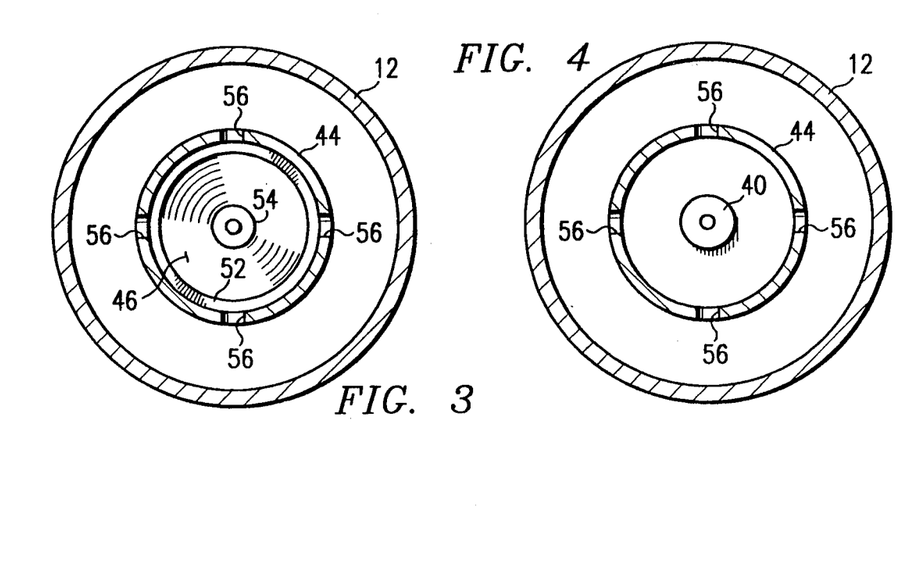
FIG. 3 is a cross-sectional view of the preferred embodiment of FIG. 1 take along line III—III.
FIG. 4 is a cross-sectional view of the preferred embodiment of FIG. 1 taken along line IV—IV.

Having described the elements of the preferred embodiment of the present invention and the manner in which they are constructed, the manner of its operation will now be described in more detail. To initiate deployment of an air bag, impact or collision sensors (not shown) will send signal to electric squib 26 through squib leads 28 to activate electric squib 26. Activation of electric squib 26 generates sufficient force to rupture main isolation disk 22. Rupture of main isolation disk 22 thereby allows compressed gas from stored gas housing 12 to flow through housing outlets 24, manifold outlets 20, and a manifold or other conduit (not shown) into an air bag (not shown). The initial flow rate into the air bag is of course governed by the pressure initially within stored gas housing 12 and by the area of housing outlets 24, manifold outlets 20, and the manifold or conduit. The compressed gas is also initially at ambient temperature because no ignition of any combustion element has yet taken place. As the compressed gas within stored gas housing 12 flows into the air bag, the pressure within stored gas housing 12 decreases. Correspondingly, the first pressure within first compartment 48 and the reference pressure within second compartment 50 also decrease, although the rate of decrease in pressure is greater in first compartment 48 compared to second compartment 50 as described above. When he reference pressure within second compartment 50 exceeds the first pressure within first compartment 48 by a predetermined amount, together with the biasing force exerted by spring 58, diaphragm 46 will rapidly invert from its first stable position as shown in FIG. 1 to its second stable position as shown in FIG. 2. The inversion of the diaphragm 46 is thus the direct result of the forces generated by the pressure differential and the bias of spring 58. However, diaphragm 46 is also preferably bimetallic to automatically compensate for changes in ambient temperature as described above, lowering the required differential pressure to move diaphragm 46 with a lowering of the ambient temperature and increasing the required differential pressure to move diaphragm 46 with an increase in ambient temperature to allow gas inflator apparatus 10 to adequately perform over a broad range of ambient temperatures.

The inversion of diaphragm 46 into its second stable position illustrated in FIG. 2 causes firing pin 54 to impact percussion primer(s) 40, which in turn ignites pyrotechnic booster 38. Ignition of pyrotechnic booster 38 then ignites gas generator propellant 36. As gas generator propellant 16 burns, sufficient pressure will build up within gas generator housing 30 to remove or rupture outlet disks 34. Once outlet disks 34 no longer isolate the interior of gas generator housing 30 from stored gas housing 12, exhaust gases from combustion of gas generator propellant 36 will flow into stored gas housing 12 and mix with the compressed gas. Consequently, the flow rate into the air bag will be increased.

Figure 5:
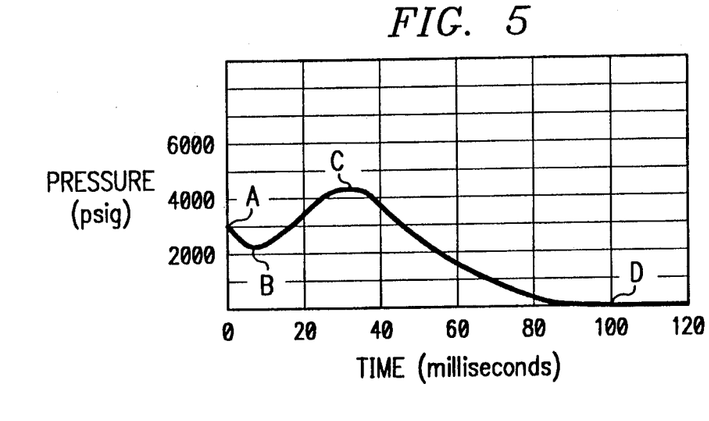
FIG. 5 is a performance curve for the pressure variation within the outer housing during inflation.
Figure 6:
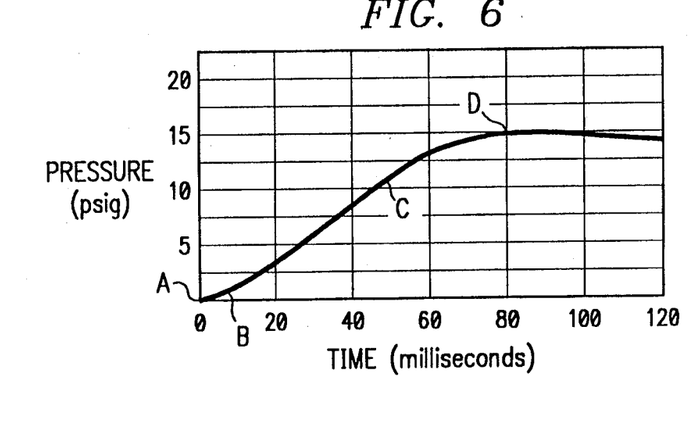
FIG. 6 is a performance curve for the pressure build-up in a fix-walled container attached to the present invention.

The operation of the preferred embodiment of the present invention is typified by the exemplary performance curves in FIGS. 5 and 6, FIG. 5 illustrating the pressure buildup rate within the stored gas housing 12 during inflation based upon an initial pressure of 3000 psi gage at 70° F., and FIG. 6 illustrating the pressure variation within a fixed wall container which is essentially indicative of the variable flow rate provided by gas inflator apparatus 10. In FIG. 5, A indicates the point at which gas begins flowing from stored gas housing 12 into the air bag. At point B, approximately 5-7 milliseconds after flow was initiated, the gas generator propellant 36 is activated, the combustion of which increases the pressure within stored gas housing 12 to a maximum level indicated at point C, which occurs approximately 30 milliseconds after flow gas initiated. Thereafter, the pressure within stored gas housing decays to a minimum level indicated at point D, which occurs approximately 100 milliseconds after inflation was initiated.

FIG. 6 illustrates the pressure buildup curve in a fixed-wall container connected to gas inflator apparatus 10, which is again indicative of the flow rate provided to the air bag. At point A, gas begins flowing from stored gas housing 12 into the container to increase the pressure at a first rate. At point B, the gas generator propellant 36 is being ignited, thereby augmenting the pressure build-up. The pressure builds up within the container ar a substantially constant rate until point C, after which the pressure continues to increase but at a lesser rate to point D. At point D, the maximum pressure is achieved after which a slight decay occurs.

Figure 7:
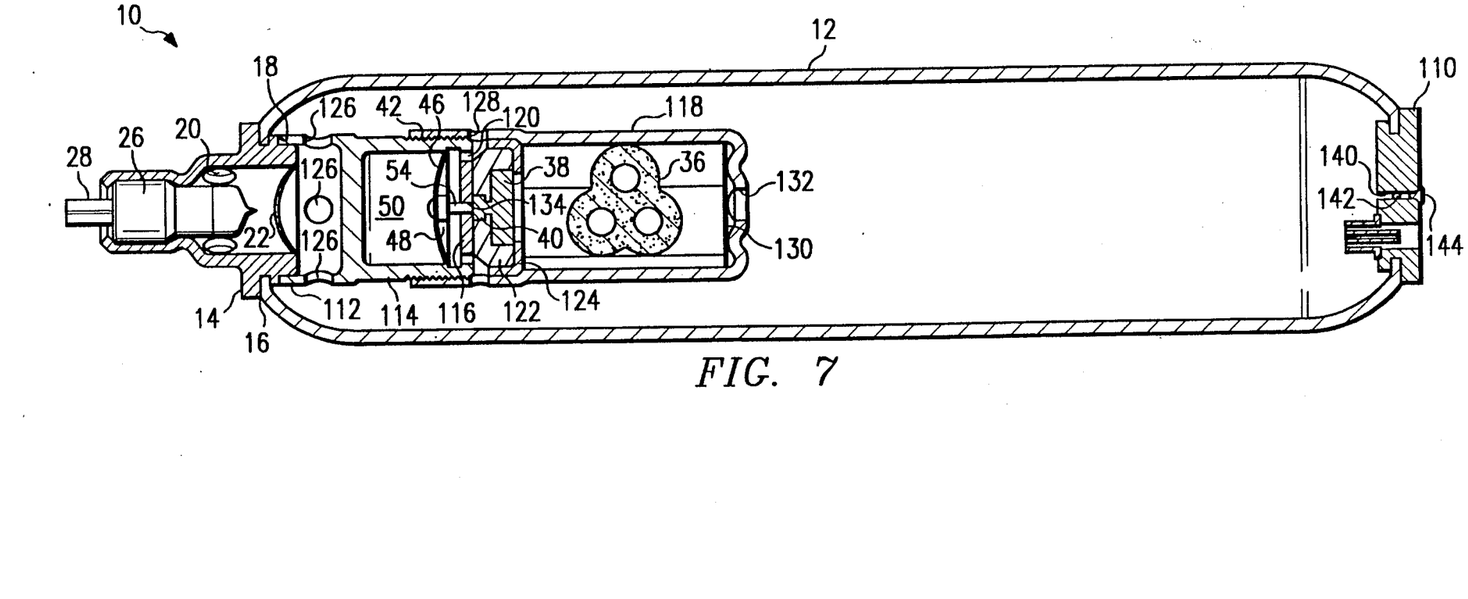
FIG. 7 is a preferred configuration of the preferred embodiment.

A more preferred configuration is illustrated in FIG. 7 where common components are similarly numbered. Stored gas housing 12 is welded to a portion of manifold connector 14 at first connection 16, preferably by friction welding. Manifold connector 14 extends within stored gas housing 12 where it engages with differential pressure housing extension 112 by a weld at second connection 18. Differential pressure housing extension 112 is preferably of an open-ended cylindrical configuration such that it can be positioned around a portion of manifold connector 14. In this regard, a plurality of extension outlets 126 are positioned on differential pressure housing extension 112 such that compressed gas may flow from stored gas housing 12 into differential pressure housing extension 112 to exert a force on main isolation disk 22, which again separates manifold 14 from the interior of differential pressure housing extension 112.

Differential pressure housing 114 is aligned and integrally formed with differential pressure housing extension 112. A back-up plate 116 is positioned over the open end of differential pressure housing 114 and is held in place by a portion of gas generator housing 118 as will be discussed below. Diaphragm 46 separates differential pressure housing 114 into first compartment 48 and second compartment 50 and has a firing pin 54 attached thereto on the side of diaphragm 46 facing first compartment 48. Firing pin 54, when engaged, passes through bore 134 in back-up plate 116 to engage percussion primer 40 to initiate augmentation.

First compartment 48 communicates with stored gas housing 12 via a plurality of differential pressure housing outlets 120 positioned on the end of back-up plate 116 and pressure outlets 128 positioned on gas generator housing 118, and thus contains compressed gas at a pressure substantially equal to that within stored gas housing 12 in the static state. Second compartment 50 contains compressed gas under a reference pressure, and may either be totally isolated from stored gas housing 12 or in communication therewith in the above-described manner (i.e., by an orifice of less area than the total area of differential pressure housing outlets 120).

Gas generator housing 118 is threadably attached to differential pressure ho sing 114 at third connection 42. The interior of gas generator housing 118 is separated from the end of differential pressure housing 114 by primer holder 122 which exerts a force on back-up plate 116 to hold it in place on the end of differential pressure housing 114. Primer holder 122 is formed such that the plurality of pressure outlets 128 will fluidly connect stored gas housing 12 with first chamber 48 of differential pressure housing 114 via differential pressure housing outlets 120. Percussion primer 40 is positioned on the end of primer holder 122 and is held in position by engaging back-up plate 116 so as to be aligned with firing pin 54. Pyrotechnic booster 38 is positioned on the opposite end of primer holder 122 and is held in position by retainer 124 which supports primer holder 122 within gas generator housing 118 by engaging an inner surface of gas generator housing 118. Gas generator propellant 36 is positioned within gas generator housing 118 and a single gas generator outlet disk 130 temporarily isolates gas generator housing 118 from stored gas housing 12 by covering the single gas generator outlet 132 positioned on the end of gas generator housing 118. Again, gas generator outlet disk 130 may be eliminated in an appropriate gas generator propellant 36 is selected.

Figure 8:
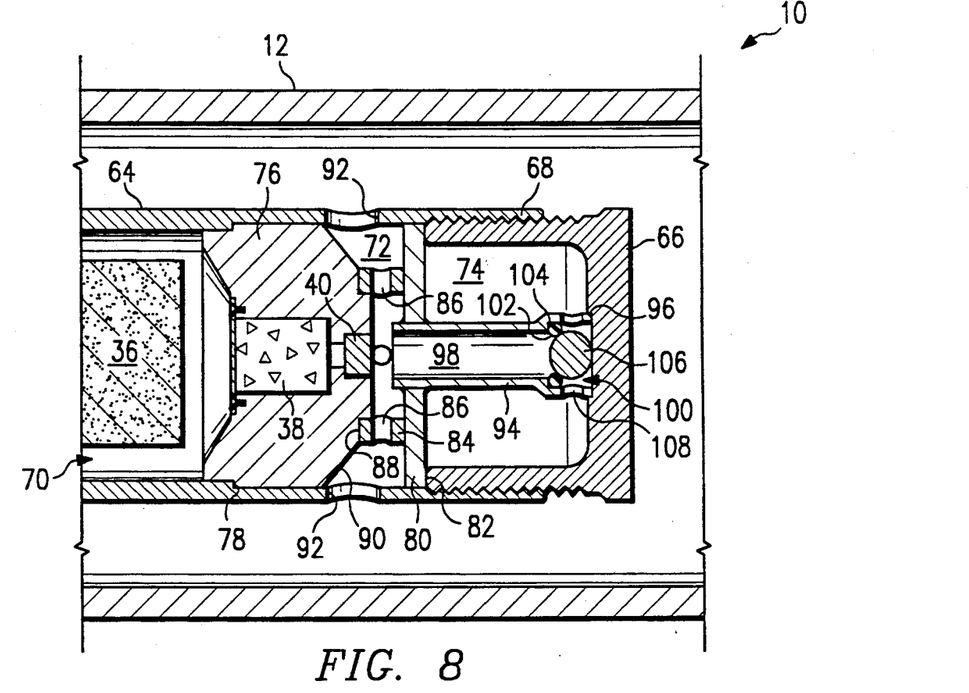
FIG. 8 is an enlarged, cross-sectional view of one alternate embodiment of the pressure-sensing and ignition means.

An alternate embodiment of the present invention is illustrated in FIG. 8 where common components of the embodiments are similarly numbered. Gas generator housing 64 is incorporates within gas inflator apparatus 10 in the same manner as gas generator housing 30 of the preferred embodiment and differs from gas generator housing 30 only as described herein and as illustrated in FIG. 8. Gas generator housing 64 is appropriately connected to differential pressure housing 66 at fourth connection 68 to form a first chamber 70, second chamber 72, and third chamber 14. First chamber 70, which stores gas generator propellant 36, is contained within gas generator housing 64 and is formed by the seating of charge holder 76 on charge holder notch 78 positioned on the interior surface of gas generator housing 64. Charge holder 76 contains percussion primer 40 and pyrotechnic booster 38 which are used to ignite gas generator propellant 36 contained within first chamber 70 to augment inflation as described above.

Second chamber 72 is formed between charge holder 76 and barrier 80 which seats against end 82 of differential pressure housing 66. Charge holder 76 and barrier 80 are separated by spacing ring 84, which has a plurality of annular sparing ring ports 86, to create the spacing for second chamber 72. One end of spacing ring 84 seats on spacing ring notch 88 on the face of charge holder 76 while the second end seats on the surface of barrier 80. Charge holder 76 also has a chamfered surface 90 to enlarge second chamber 72 and to allow gas generator ports 92 on gas generator housing 64 to establish fluid communication between the interior of stored gas housing 12 and second chamber 72.

Third chamber 74, which contains compressed gas under a reference pressure, is formed by the sealing of differential pressure housing 66 by barrier 80. Positioned within third chamber 74 is tube 94 which seats against tube recess 96 on the end of differential pressure housing 66 and extends through barrier 80 into second chamber 72, in alignment with percussion primer 40, to establish fluid communication with second chamber 72. Tube 94 is welded to barrier 80 to provide a sufficient seal for differential pressure housing 66 although other suitable attachment methods may be used.

Positioned within the 94 is O-ring 102, which seats against O-ring recess 104 on the interior of tube 94, and projectile 106. On the dynamic state (discussed below), projectile 106 seats against O-ring 102 to essentially separate tube 94 into a first tube chamber 98 which communicates with second chamber 72, and thus stored gas housing 12, and a second tube chamber 100 which communicates with differential pressure housing 66 through tube ports 108. However, in the static state, it is not essential that projectile 106 seat against O-ring 102 in this manner, and thus the pressures within stored gas housing 12, second chamber 72, first tube chamber 98, and second tube chamber 100 may be substantially equal at this time.

O-ring 102 and projectile 106 of this alternate embodiment function similarly to diaphragm 46 of the preferred embodiment. When compressed gas from stored gas housing 12 begins flowing into the air bag in the above-described manner, he pressure within stored gas housing 12, and thus second chamber 72 and first tube chamber 98, decreases, resulting in projectile 106 seating against O-ring 102 to isolate first tube chamber 98 from second tube chamber 100. When the reference pressure within second tube chamber 100 exceeds the pressure within first tube chamber 98 by a predetermined amount, O-ring 102 allows projectile 106 to pass into first tube chamber 98 where it is propelled into contact with percussion primer 40 by the pressure differential to ignite gas generator propellant 36 via activation of pyrotechnic booster 38 which augments the flow into the air bag as described above. As with the preferred embodiment, an orifice may be positioned on differential housing 66 which will result in a reference pressure which decreases along with the pressure in stored gas housing 12, but at a lower rate than that within stored gas housing 12, second chamber 72, and first tube chamber 98. Moreover, a separate filling connector known in the art may be incorporated on differential pressure housing 66 to supply compressed gas thereto.

O-ring 102 is also preferably temperature sensitive like bimetallic diaphragm 46 in that less differential pressure will be required for O-ring 102 to release projectile 106 as the ambient temperature decreases to compensate for the lowering of the rate of combustion of propellant 36 as the ambient temperature is lowered as discussed above, while a larger differential pressure will be required to release projectible 106 as the ambient temperature increases for the above-discussed reasons. More particularly, O-ring 102 is preferably constructed from a material which allows the cross-sectional area of O-ring 102 to decrease with a decrease in ambient temperature and increase with an increase in ambient temperature, all while maintaining sufficient elasticity over a broad temperature range. Consequently, as the ambient temperature decreases, the cross-sectional area of O-ring 102 will decrease such that less force (differential pressure) will be required for projectile 106 to pass through O-ring 102. Furthermore, as the ambient temperature increases, O-ring 102 will expand into contact with O-ring recess 104 and the cross-sectional area of O-ring 102 will increase such that more force (differential pressure) will be required for projectile 106 to pass through O-ring 102. A preferred material for O-ring 102 which possess these types of characteristics is silicone rubber which has a high coefficient of expansion and a low modulus of elasticity which is relatively constant across a broad temperature range.

The geometrical configuration of O-ring 102 is not limited to a conventional O-ring, the only actual limitation being that it must be able to release at projectile 106 in the above-described manner. In addition, the geometrical configuration of projectile 106 is only limited by the requirement that it must seat against O-ring 102 in the dynamic state to allow the development of a sufficient pressure differential to allow projectile 106 to pass through O-ring 102 and impact percussion primer 40 to initiate activation of gas generator propellant 36.

Figure 9:
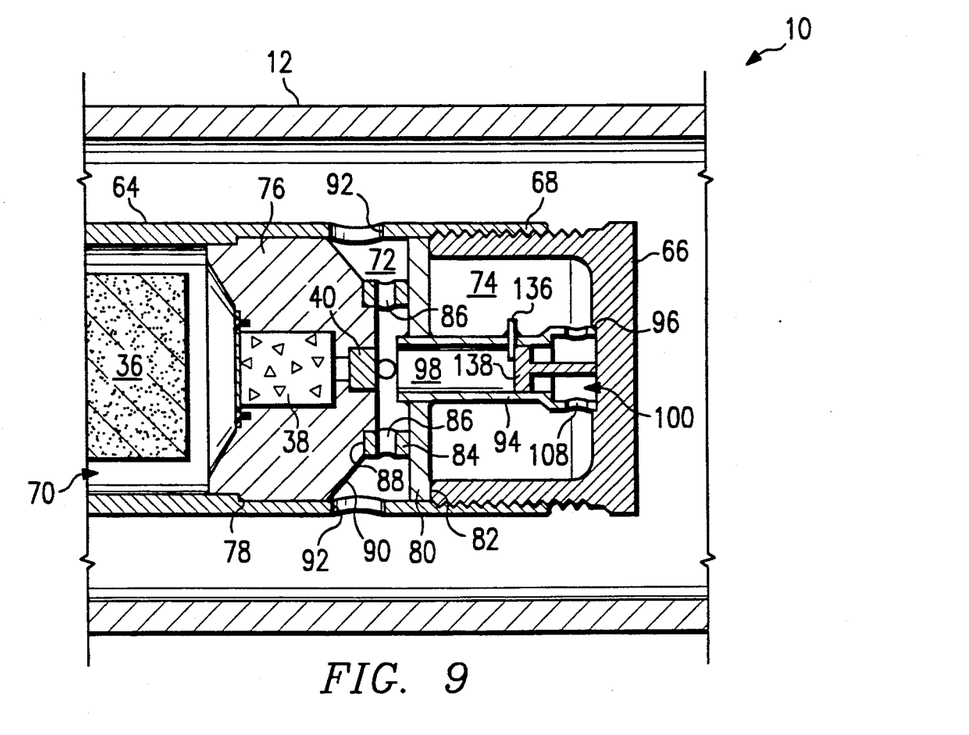
FIG. 9 is an enlarged, cross-sectional view of a second alternate embodiment of the pressure-sensing and ignition means.

Another embodiment is illustrated in FIG. 9 in which the primary modification from the embodiment of FIG. 8 is the replacement of O-ring 102 and projectile 106 with retention pin 126 and piston 138. Piston 138 is slidable within tube 94 and its motion is initially limited by retention pin 136 which is attached to and extends within the interior of tube 94, the attachment being by welding or other suitable alternatives. In the dynamic state (discussed below), piston 138 is forced against retention pin 136 to again essentially separate tube 94 into first tube chamber 98, which communicates with stored gas housing 12 and second chamber 72, and second tube chamber 100, which communicates with differential pressure housing 66 through tube ports 108 and is thus under a reference pressure.

Retention pin 136 and piston 138 of this embodiment function similarly to diaphragm 46 of the preferred embodiment. When compressed gas from stored gas housing 12 begins flowing into the air bag in the above-described manner, the pressure within stored gas housing 12, and thus second chamber 72 and first tube chamber 98, decreases, and piston 138 is forced against retention pin 136 by the pressure differential. When the reference pressure within second tube chamber 100 exceeds the pressure within first tube chamber 98 by a predetermined amount, piston 138 will exert a force sufficient to shear retention pin 136. Consequently, piston 138 is driven by the differential pressure into contact with percussion primer 40 to produce the above-described augmentation.

Retention pin 136 is formed from materials having a substantially uniform shear strength over a broad range of temperatures, the preferred material being 2017 aluminum in H-13 condition. Although this particular embodiment is not temperature compensated, the retention pin 136 and piston 138 at bistably like diaphragm 46, the first stable position being when retention pin 136 is retaining piston 138 and the second stable position being when piston 138 shears retention pin 136 to impact percussion primer 40.

Although the construction and operation has been described in the above manner, those skilled in the art will appreciate that numerous modifications can be made without departing from the teachings of the present invention. For instance, all major elements need not be contained within stored gas housing 12. Particularly, stored gas housing 12, -as generator housing 30, and differential pressure housing 44 could be aligned in end-to-end fashion as could the corresponding elements in the alternate embodiments. However, such a configuration would detract from the space saving feature of the preferred embodiment. Notwithstanding, in applications where there are little or not space restrictions, such a configuration may be appropriate.

There are other structural modifications which are encompassed by the present invention. For instance, gas generator housing 30 and differential pressure housing 44 could of course be combined into a single housing as could the corresponding elements in the alternate embodiments.

Another modifiable feature is spring 58 which exerts a force on diaphragm 46, and thus offers a tool for adjusting the delay of gas inflator apparatus 10. Spring 58 can be removed altogether or replaced by another spring 58 having a different spring constant. Furthermore, the reference pressure in all embodiments may be completed isolate or a small orifice may allow limited communication with the outer housing provided that an appropriate pressure differential develops to initiate augmentation as described above.

The foregoing description of the invention has been presented for purposes or illustration and description. Further, the description is not intended to limit the invention to the form disclosed herein. Consequently, variations and modifications commensurate with the above teachings, in the skill or knowledge of the relevant art, are within the scope of the present invention. The embodiments described hereinabove are further intended to explain best modes known of practicing the invention and to enable others skilled in the art to utilize the invention in such, or other, embodiments and with the various modifications required by their particular applications or uses of the invention. It is intended that the appended claims be construed to include alternative embodiments to the extent permitted by the prior art.

What is claimed is:

1. An apparatus for inflating an inflatable container in which a time delay is provided and wherein a gas propellant is activated without direct use of an electric signal to increase the inflation rate, comprising:
   first means for continuing gas and having a wall;
   electro-explosive device means for creating a path for gas from said first means to the inflatable container, wherein said electro-explosive device means is electrically activated;
   propellant means positioned within said first means; and
   bistable pressure-sensing means having a first stable position and a second stable position and connected, directly or indirectly, to said first means, wherein said bistable pressure-sensing means controls activation of said propellant means and wherein said propellant means is activated after a delay dependant upon at least one factor and without electrical activation thereof to increase the flow of gas into the inflatable container.

2. An apparatus, as claimed in claim 1, further including temperature compensating means.

3. An apparatus, as claimed in claim 2, wherein said temperature compensating means reduces said delay as the ambient temperature decreases.

4. An apparatus, as claimed in claim 2, wherein said temperature compensating means increases said delay as the ambient temperature increases.

5. An apparatus, as claimed in claim 1, wherein said bistable pressure-sensing means monitors a differential pressure between a first pressure related to the pressure of the gas in said first means and a reference pressure.

6. An apparatus, as claimed in claim 5, wherein at least a portion of said bistable pressure-sensing means moves from said first stable position to said second stable position when said reference pressure exceeds said first pressure by a predetermined amount to initiate activation of said propellant means.

7. An apparatus, as claimed in claim 6, wherein said bistable pressure sensing means includes diaphragm means deflected in one position in said first stable position and deflected is an opposite position in said second stable position.

8. An apparatus, is claimed in claim 6, wherein said bistable pressure sensing means includes retaining means and projectile means, said first stable position being retention of said projectile means by said retaining means and said second stable position being the release of said projectile means by said retaining means.

9. An apparatus, as claimed in claim 6, wherein said bistable pressure sensing means includes retention pin means and projective means, said first stable position being retention of said projectile by said retention means and said second stable position being the breaking of said retention means to release said projectile means.

10. An apparatus as claimed in claim 6, wherein movement of said bistable pressure-sensing means from said first to said second stable position propels firing mass means into contact with ignition means to activate said propellant means.

11. An apparatus, as claimed in claim 10, wherein said ignition means includes at least one of the following: pyrotechnic booster proximate to said propellant means and at least one percussion primer adjacent to said pyrotechnic booster, wherein said firing mass means is aligned with and impacts said percussion primer to activate said pyrotechnic booster and said propellant means.

12. An apparatus, as claimed in claim 1, wherein said bistable pressure sensing means includes temperature sensing means.

13. An apparatus for inflating an inflatable container, comprising:
   first enclosure means containing compressed gas under a first pressure;
   first barrier means for providing a barrier between said first enclosure means and the inflatable container;
   means for removing said first barrier means, wherein said compressed gas in said first enclosure means begins to flow said first enclosure means into the inflatable container;
   a combustible material positioned within said first enclosure means;
   pressure-sensing means connected, directly or indirectly, to said first enclosure means for controlling ignition of said combustible material, wherein said combustible material is ignited after a delay dependent upon at least one factor; and
   temperature compensating means connected, directly or indirectly, to said first enclosure means, wherein said temperature compensating means automatically adjusts said delay based upon the ambient temperature.

14. An apparatus, as claimed in claim 13, wherein said pressure-sensing means monitors a differential pressure between a second pressure related to said first pressure and a reference pressure.

15. An apparatus, as claimed in claim 14, wherein said pressure-sensing means initiates ignition of said combustible material when said reference pressure exceeds said second pressure by a predetermined amount.

16. An apparatus, as claimed in claim 14, wherein said pressure-sensing means includes at least retaining means and projectile means.

17. An apparatus, as claimed in claim 16, wherein said retaining means releases said projectile means when said reference pressure exceeds said second pressure by a predetermined amount to initiate ignition of said combustible material.

18. An apparatus, as claimed in claim 17, wherein said retaining means in part of said temperature compensating means.

19. An apparatus, as claimed in claim 18, wherein said retaining means reduces the pressure differential required to release said projectile means as the ambient temperature decreases.

20. An apparatus, as claimed in claim 18, wherein said retaining means increases the pressure differential required to release said projectile means as the ambient temperature increases.

21. An apparatus, as claimed in claim 17, wherein said projectile means impacts ignition means to ignite said combustible material.

22. An apparatus, as claimed in claim 21, wherein said ignition means includes at least one of the following: pyrotechnic booster proximate to said combustible material and at least one percussion primer adjacent to said pyrotechnic booster, wherein said projectile means impacts said percussion primer to ignite said combustible material.

23. An apparatus, as claimed in claim 16, wherein said pressure-sensing means is positioned within second enclosure means connected to said first enclosure means.

24. An apparatus, as claimed in claim 23, wherein said pressure-sensing means separates said second enclosure means into first and second chambers, said first chamber being in communication with said first enclosure means and under said second pressure, said second pressure being substantially equal to said first pressure in the static state, and said second chamber containing compressed gas at said reference pressure.

25. An apparatus, as claimed in claim 24, wherein said pressure-sensing means is positioned in tube means connecting said first and second chambers.

26. An apparatus, as claimed in claim 25, wherein said retaining means releases said projectile means when said reference pressure exceeds said second pressure by a predetermined amount to initiate ignition of said combustible material.

27. An apparatus, as claimed in claim 26, wherein said retaining means is part of said temperature compensating means.

28. An apparatus, as claimed in claim 27, wherein said retaining means reduces the pressure differential required to release said projectile means as the ambient temperature deceases.

29. An apparatus, as claimed in claim 27, wherein said retaining means increases the pressure differential required to release said projectile means as the ambient increases.

30. An apparatus, as claimed in claim 14, wherein said pressure sensing includes diaphragm means.

31. An apparatus, as claimed in claim 30, wherein said diaphragm means moves from a first position to a second position when said reference pressure exceeds said second pressure by a predetermined amount to initiate ignition of said combustible material.

32. An apparatus, as claimed in claim 31, wherein said diaphragm means is part of said temperature compensating means.

33. An apparatus, as claimed in claim 32, wherein a smaller pressure differential is required to move said diaphragm means from said first position to said second position as the ambient temperature decreases.

34. An apparatus, as claimed in claim 32, wherein a larger pressure differential is required to move said diaphragm means from said position to said second position as the ambient temperature increases.

35. An apparatus, as claimed in claim 30, wherein said pressure sensing means is positioned within second enclosure means connected to said first enclosure means.

36. An apparatus, as claimed in claim 35, wherein said diaphragm means separates said second enclosure means into first and second chambers, said first chamber being in communication with said first enclosure means and under said second pressure, said second pressure being substantially equal to said first pressure in the static state, and said second chamber containing compressed gas at said reference pressure.

37. An apparatus, as claimed in claim 36, wherein said diaphragm means moves from a first position to a second position when said reference pressure exceeds said second pressure by a predetermined amount to initiate ignition of said combustion material.

38. An apparatus, as claimed in claim 37, wherein said diaphragm means is part of said temperature compensating means.

39. An apparatus, as claimed in claim 38, wherein a smaller pressure differential is required to move said diaphragm means from said first position to said second position as the ambient temperature decreases.

40. An apparatus, as claimed in claim 38, wherein a larger pressure differential is required to move said diaphragm means from said first position to said second position as the ambient temperature increases.

41. An apparatus, as claimed in claim 13, wherein said temperature compensating means reduces said delay as the ambient temperature decreases.

42. An apparatus, as claimed in claim 13, wherein said temperature compensating means increases said delay as the ambient temperature increases.

* * * * *